Aug. 11, 1970   R. RACINE ET AL   3,523,626
HEATED WINDSHIELD WIPER
Filed Dec. 11, 1968   2 Sheets-Sheet 1
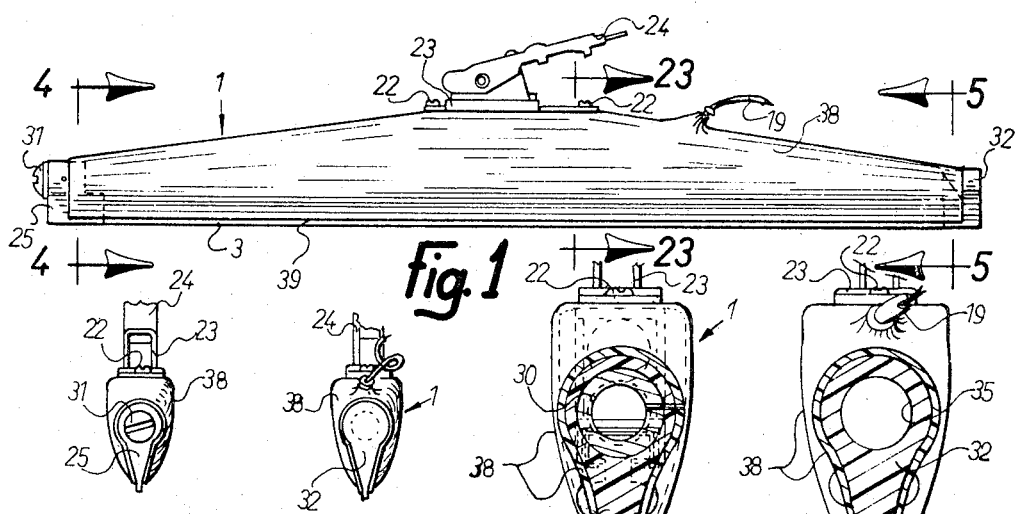
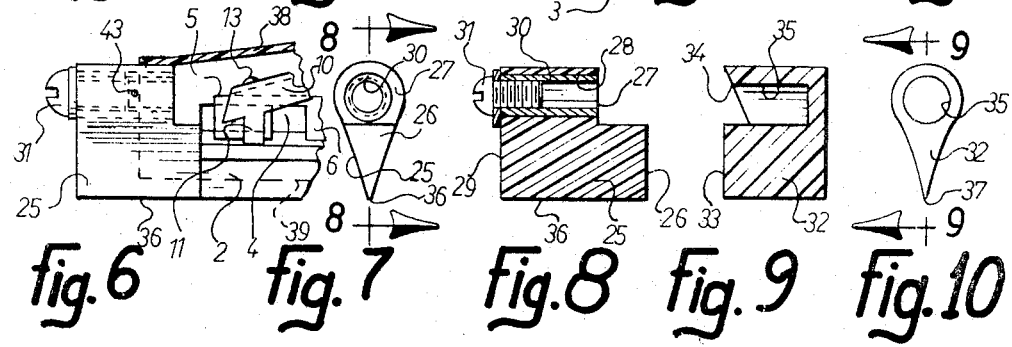
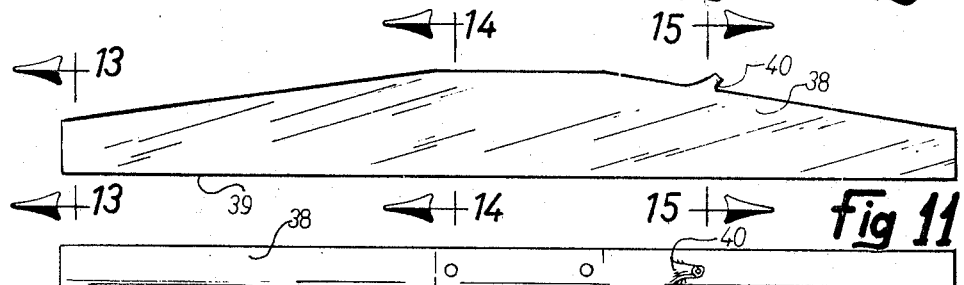
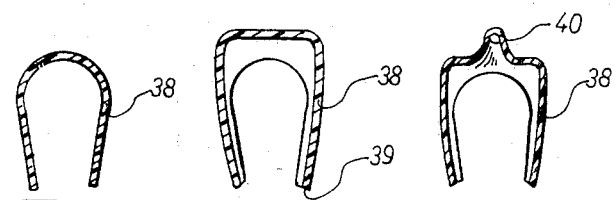
INVENTORS
Roland RACINE
Elie GAUTHIER
BY Pierre Espérance
AGENT

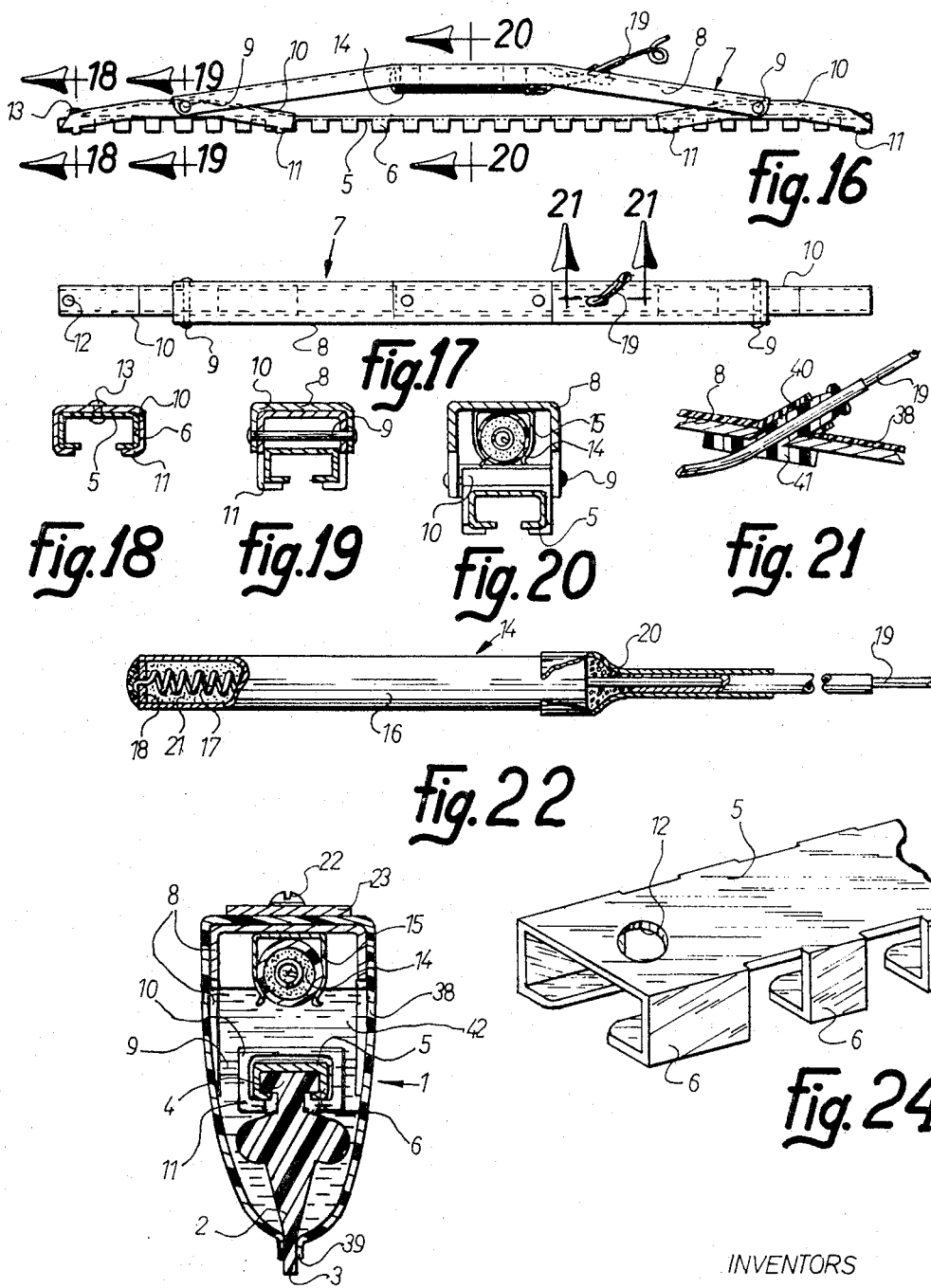

United States Patent Office 3,523,626
Patented Aug. 11, 1970

1

3,523,626
HEATED WINDSHIELD WIPER
Roland Racine, 2709A Orleans St., and Elie Gauthier, 3551A Bordeaux St., both of Montreal, Quebec, Canada
Filed Dec. 11, 1968, Ser. No. 782,851
Int. Cl. B60s 1/04; A47l 1/16
U.S. Cl. 15—250.07                    10 Claims

ABSTRACT OF THE DISCLOSURE

A heated windshield wiper assembly comprising the usual resilient wiping blade, the flexible support therefor and the pressure distributing device connected to the support. A flexible fluid-proof envelope surrounding the pressure distributing device and the support, and adhered to the sides of the wiping blade to form a fluid-tight chamber containing a liquid heated by an electric heating element disposed in the chamber.

---

The present invention relates to improvements in automotive windshield wipers and, more particularly, to a windshield wiper provided with means for heating the same for use during winter driving conditions where snow, sleet or freezing rain on windshields and windshield wipers, are encountered.

Practically all makes of motor vehicles are provided with means for heating the windshield during the winter season for preventing sleet, ice or snow from glazing the windshield of the vehicle. The means normally include a blast of hot air directed onto the inside surface of the windshield. These means are usually effective for the purpose but, unfortunately, they do not prevent the formation of ice on the windshield wiper itself. This ice rapidly accumulates, under certain atmospheric conditions, and even builds up to such an extent as to lift the windshield wiper blade off the glass surface, whereby the windshield wiper becomes no longer effective and soon snow, sleet or ice accumulates on the windshield surface itself, thereby considerably decreasing visibility.

The driver of the motor vehicle frequently has to stop the car and manually clean the windshield wiper assembly.

Various systems of heated windshield wiper blades are already known, but in these systems the purpose is to direct the heat onto the windshield surface itself to melt the snow or ice thereon. The location of the heating elements in the wiper assembly is such, in those previous devices, that the metal structure of the windshield wiper assembly is not heated and soon covered with ice or sleet, which builds up as aforesaid.

Moreover, the location of the heat wire in the wiper blade itself, in some of the known devices, considerably increases the cost of manufacture of the wiper blade. The location of the heating wire on each side of the wiper blade and retained by a metal bracket, as shown in Canadian Pat. 670,021, dated Sept. 10, 1963 and issued to Curry G. Bell for a Heated Windshield Wiper, results in a cumbersome windshield wiper system and also which is too rigid to follow the curvature of the windshield during oscillating movement of the wiper. Moreover, in this system, considerable heat is lost to the atmosphere and the system is therefore far from efficient.

Accordingly, the general object of the present invention resides in the provision of a heated windshield wiper system, of improved construction and efficiency, and which will obviate the above-noted disadvantages.

Another object of the present invention resides in the provision of a heated windshield wiper, in which the heating element is not embedded in the wiper blade, whereby the latter need not be shaped or formed in a special manner and whereby the system can be used with all kinds of windshield wiper blades.

Another object of the invention resides in the provision of a heated windshield wiper, which is relatively inexpensive to manufacture.

A more specific object of the present invention resides in the provision of a heated windshield wiper in which the resilient flexible support for the wiper blade, the pressure distributing device connected to the support and at least part of the wiper blade itself, are surrounded by an envelope forming a fluid-tight chamber in which the heating element is located, said heating element adapted to heat a liquid partially filling said chamber, whereby the liquid will keep in warm condition the metal parts of the windshield wiper assembly and the rubber wiper blade to a point close to its wiping edge, whereby formation of sleet, ice or snow is positively and efficiently prevented on the entire windshield wiper assembly.

The foregoing and other objects of the present invention will become more apparent during the following disclosure and by referring to the drawings, in which:

FIG. 1 is a side elevation of the windshield wiper assembly showing a portion of the wiper arm;
FIG. 2 is a left end view of the assembly of FIG. 1;
FIG. 3 is a right end view of the assembly of FIG. 1;
FIG. 4 is a cross-section, on an enlarged scale, taken along line 4—4 of FIG. 1;
FIG. 5 is a cross-section, on an enlarged scale, taken along line 5—5 of FIG. 1;
FIG. 6 is a side elevation of the left-hand portion of the assembly of FIG. 1, the envelope being shown in longitudinal section to see internal parts;
FIG. 7 is an inner end elevation of the end piece shown in FIG. 6;
FIG. 8 is a longitudinal section of said end piece, taken along line 8—8 of FIG. 7;
FIG. 9 is a longitudinal section of the end piece located at the right end of the assembly of FIG. 1, said section being taken along line 9—9 of FIG. 10;
FIG. 10 is an inner end elevation of the piece of FIG. 9;
FIG. 11 is a side elevation of the envelope;
FIG. 12 is a top plan view of the envelope;
FIGS. 13, 14, and 15 are cross-sections of the envelope taken along line 13—13, 14—14, and 15—15 respectively of FIG. 11;
FIG. 16 is a side elevation of the pressure distributing device together with the heating element fitted therein;
FIG. 17 is a top plan view of the pressure distributing device;
FIGS. 18, 19, and 20 are cross-sections, on an enlarged scale, taken along lines 18—18, 19—19, and 20—20 respectively of FIG. 16;
FIG. 21 is a partial longitudinal section, on an enlarged scale, taken along line 21—21 of FIG. 17;
FIG. 22 is an elevation, partially in longitudinal section, of the electric heater;
FIG. 23 is a cross-section, on an enlarged scale, taken along line 23—23 of FIG. 1; and
FIG. 24 is a partial perspective view, on an enlarged scale, of one end portion of the resilient flexible support for the wiper blade.

In the drawings, like reference characters indicate like elements throughout.

The heated windshield wiper assembly in accordance with the invention is generally indicated at 1 in FIG. 1, and is shown in cross-section in FIG. 23.

It comprises the usual resilient wiper blade 2, preferably made of extruded rubber, having a wiping edge 3 to contact a vehicle windshield and a longitudinal head 4 opposite wiping edge 3. Head 4 is held along the entire length of blade 2, by the conventional resilient flexible support 5, said support, as shown in FIGS. 16 and 24, consisting of a resilient metal strip having spaced lateral downwardly and inwardly extending tabs 6 surrounding the head 4 at spaced intervals, so as to secure together the support 5 and blade 2, while allowing longitudinal flexing of the support and blade to take care of windshield curvature.

The support 5 is connected to a pressure distributing device, of conventional construction, generally shown at 7 in FIGS. 16 and 17, and comprising a primary yoke 8, of channel-shaped cross-section, to both ends of which are pivoted at 9 the center portions of secondary yokes 10, also of channel-shaped construction and, in the example shown, connected to the support 5 by means of inwardly directed end tab 11 engaging underneath tabs 6 of support 5. However, it is understood that tabs 11 could engage directly underneath the strip of support 5 between tabs 6. Also, it is understood that support 5 could be of other conventional construction, such as a flat strip with an elongated slot in the middle, to accommodate a suitably shaped head of the blade 2.

In the example shown, the left end of support 5 has a hole 12, shown in FIG. 24, for receiving a rivet or the like 13, which serves to affix the support 5 to one end of one of the secondary yokes 10, the other secondary yoke being entirely free of firm connection with the support 5, so that the latter may move longitudinally with respect to the same and also with respect to the other end of the first-named secondary yoke. For example, in FIG. 16 it is seen that rivet 13 rigidly connects the left end of the left-hand secondary yoke to the left end of the support 5.

An electric heater 14 is secured by means of spring clips 15 in the central portion of the channel-shaped primary yoke 8 between the flange thereof. As seen in FIG. 22, the electric heater 14 may be in the shape of a cylindrical metal cartridge 16, in which extends an electric heating coil 17 which is soldered at one end to a disc 18, itself soldered to the end of cartridge 16.

The other end of the coil 17 is connected to an electric supply wire 19, which is covered by a protecting and insulating plastic sleeve 20, also covering part of the cartridge 16.

Cartridge 16 is filled with a refractory powder 21. The clips 15 are secured to the primary yoke 8 by means of 22 (see FIGS. 1 and 23), which also serve to secure to the primary yoke a conventional connector 23 for detachably and pivotally connecting the wiper assembly 1 to the usual wiper arm 24.

As shown in FIG. 6, an end piece 25 is secured to the left end of blade 2, looking at FIG. 1. Said end piece is also shown in FIGS. 2, 4, 7, and 8. End piece 25 has an inner end face 26 adapted to be firmly adhered to the end face of the blade 2 in alignment therewith. End piece 25 has a recessed face 27 in which opens a through bore 28 opening also at the outer end face 29 of the end piece 25. Through bore 28 is lined with a threaded metal sleeve 30, normally receiving a screw plug 31 for closing the bore in fluid-tight manner.

A second end piece 32, shown in FIGS. 5, 9, and 10, has an inner face 33 adapted to be firmly adhered to the opposite end face of the wiper blade 2. The end face 33 has a recessed inner bevelled end face portion 34 spaced from the corresponding end face of the blade 2. Piece 33 has a blind bore 35 opening at recessed face 34.

As shown in FIG. 6 and also in FIG. 4, at least part of the head 4 of the blade 2 extends beyond the end faces 26 and 33 of the end pieces 25 and 32 respectively. The portions of the end pieces provided with bores 28 and 35 respectively have a rounded external cross-sectional shape merging with tapering side faces, the latter generally conforming to the blade 2. The end pieces have respective thin edges 36, 37 forming a continuation of the wiper blade edge 3.

In accordance with the invention, a flexible fluid-tight envelope 38 surrounds the pressure distributing device 7, the support 5 and at least part of the wiper blade 2. Said envelope 38 also partially surrounds the end pieces 25 and 32 and is adhered thereto by means of a suitable glue. The envelope 38 is preferably made of synthetic rubber, such as neoprene, of elongated shape and has longitudinal edges 39, which are glued to each side of the wiper blade 2 near the wiping edge 3 thereof and substantially parallel thereto. The envelope 38 is applied flat against the center portion of the primary yoke 8 on the outside thereof and extends between said yoke 8 and the connector 23, whereby the holes made in the yoke 8 for receiving the screws 22, are completely sealed by the envelope 38.

As shown in FIG. 21, the electric supply wire 19 for the electric heater 14 extends through a hole made in the primary yoke 8 and a sleeve 40 formed by the envelope 38. However, to make the joint completely fluid-tight, a rubber bushing 41 is preferably inserted into said hole and sleeve 40 and tightly surrounds the wire 19. Thus, the envelope 38 forms a completely fluid-proof chamber containing the pressure distributing device 7, the support 5 and the major part of blade 2. Said chamber is partially filled through sleeve 30 with a liquid 42, preferably a liquid having a low temperature of solidification; for instance, a mixture of ethylene glycol and water is used. The liquid fills the chamber sufficiently so as to be in contact with the heater 14 irrespective of the position in space of the wiper assembly. Thus, the liquid is adapted to be heated by the heater 14. Preferably, the end piece 25 is provided with a small diameter air vent hole 43 (see FIG. 6) to allow discharge of the heated air. The recessed face 27 of end piece 25 allows free flow of the liquid during filling. Bore 35 of end piece 32 allows the liquid to heat the latter.

The electric supply wire of the heater is connected to the car electric supply system with the interposition of a suitable switch accessible to the automobile driver. The switch may be combined with a rheostat, if so desired, to adjust the degree of heating. The heater is grounded by clips 15 attached to the primary yoke 8, which is itself grounded through the wiper arm 24.

Envelope 38 radiates heat uniformly across its entire surface and effectively prevents the formation of ice or sleet thereon and also on connector 23 and the outer end of wiper arm 24.

What we claim is:

1. A heated windshield wiper assembly comprising, in combination, a resilient elongated wiping element having a wiping edge and longitudinal side faces, a resiliently flexible support therefor, a pressure distributing device connected to said support at spaced points therealong, a flexible fluid-proof envelope surrounding said device and said support and extending along the longitudinal faces of said wiping element and having longitudinal marginal portions adhered to said side faces, whereby said envelope defines a fluid-tight chamber in which said support, said device and at least part of said element are located, a heating element disposed in said chamber, said chamber adapted to contain a liquid to be heated by said heating element.

2. A wiper assembly as claimed in claim 1, further including end pieces secured to said wiping element at the ends thereof, said envelope having end marginal portions adhered to said end pieces, said end pieces closing the ends of said chamber, one of said end pieces providing a normally closed liquid filling opening for said chamber.

3. A wiper assembly as claimed in claim 2, wherein one of said end pieces has an air vent in communication with said chamber.

4. A wiper assembly as claimed in claim 2, wherein said end pieces have converging side faces forming extensions of the side faces of said wiping element, and a longitudinal edge forming an extension of the wiping edge of said wiping element.

5. A wiper assembly as claimed in claim 1, wherein said envelope longitudinal edge portions extend close to and substantially parallel with the wiping edge of said wiping element, whereby said chamber surrounds said wiping element to a zone close to the wiping edge of the latter.

6. A wiper assembly as claimed in claim 1, wherein said pressure distributing device includes a primary yoke, of channel form, defining spaced flanges directed towards said wiping element, said heater being an elongated cartridge secured to said primary yoke between said flanges.

7. A wiper assembly as claimed in claim 1, further including a connector element adapted to be detachably pivotally connected to a wiper arm and secured to said pressure distributing device, said envelope extending between said connector and pressure distributing device and tightly secured between the same.

8. A wiper assembly as claimed in claim 1, wherein said pressure distributing device includes a primary yoke, of channel-shaped, cross-section defining two spaced flanges extending towards said wiping element, said heating element in the form of an elongated cartridge secured to said primary yoke between said flanges, said wiper assembly further including a connector element adapted to be pivotally and detachably secured to a wiper arm and in turn secured to said primary yoke opposite said flanges, said envelope extending between said connector element and primary yoke and sandwiched between the same.

9. A wiper assembly as claimed in claim 8, further including an electric supply wire for said heater extending through said primary yoke and said envelope and further including means to seal said envelope about said electric supply wire.

10. A heated windshield wiper assembly comprising, in combination, a resilient elongated wiping element having a wiping edge and longitudinal side faces, a resilient flexible support therefor, a pressure distributing device connected to said support at spaced points therealong, a flexible fluid-proof envelope surrounding said device and said support and extending along the side faces of said wiping element and adhered to the latter along a zone slightly spaced from the wiping edge of said wiping element and substantially parallel thereto, means to close the ends of said envelope whereby said envelope and means define a fluid-tight chamber in which said support, said device and at least part of said wiping element are located, a heating element attached to said pressure distributing device and disposed inside said chamber, a liquid having a low temperature of solidification, partially filling said chamber, and in contact with said heating element independently of the position of said wiper assembly and space.

References Cited
UNITED STATES PATENTS

| | | | |
|---|---|---|---|
| 2,677,143 | 5/1954 | Blaney | 15—250.06 |
| 2,755,499 | 7/1956 | Mays | 15—250.06 |
| 3,372,421 | 3/1968 | Meltzer | 219—203 X |
| 3,418,676 | 12/1968 | Byczkowski et al. | 15—250.06 X |
| 3,447,186 | 7/1969 | Senkewich | 15—250.07 X |

VOLODYMYR Y. MAYEWSKY, Primary Examiner

U.S. Cl. X.R.

219—203